(12) United States Patent
Appleyard et al.

(10) Patent No.: US 8,539,345 B2
(45) Date of Patent: Sep. 17, 2013

(54) UPDATING PORTLET INTERFACE CONTROLS BY UPDATING A HIDDEN VERSION OF THE CONTROL AND THEN SWITCHING IT WITH A DISPLAYED VERSION

(75) Inventors: James P. Appleyard, North Richland Hills, TX (US); Romelia H. Flores, Keller, TX (US); Jason A. Salcido, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1839 days.

(21) Appl. No.: 11/459,429

(22) Filed: Jul. 24, 2006

(65) Prior Publication Data

US 2008/0040672 A1 Feb. 14, 2008

(51) Int. Cl.
G06F 17/00 (2006.01)
(52) U.S. Cl.
USPC ............................. 715/255; 715/234; 715/742
(58) Field of Classification Search
USPC ................. 715/255–256, 234, 200, 700, 742, 715/744
See application file for complete search history.

(56) References Cited

U.S. PATENT DOCUMENTS

| | | | | |
|---|---|---|---|---|
| 5,440,735 A * | 8/1995 | Goldring | ............................. | 1/1 |
| 6,011,537 A | 1/2000 | Slotznick | | |
| 7,162,717 B1 * | 1/2007 | Harris | ............................ | 717/168 |
| 7,236,938 B2 * | 6/2007 | Shan et al. | ........................ | 705/8 |
| 7,346,843 B2 * | 3/2008 | Hind et al. | ..................... | 715/234 |
| 7,480,698 B2 * | 1/2009 | Potter | ............................ | 709/217 |
| 7,500,181 B2 * | 3/2009 | Kim et al. | ..................... | 715/234 |
| 7,590,687 B2 * | 9/2009 | Bales et al. | ..................... | 709/203 |
| 7,636,881 B2 * | 12/2009 | Lection et al. | ................. | 715/205 |
| 2003/0058271 A1 * | 3/2003 | Van Der Meulen | ........... | 345/738 |
| 2003/0132944 A1 * | 7/2003 | Smith | ........................... | 345/581 |
| 2003/0167315 A1 * | 9/2003 | Chowdhry et al. | ........... | 709/218 |
| 2004/0122971 A1 | 6/2004 | Joshi et al. | | |
| 2004/0205555 A1 * | 10/2004 | Hind et al. | ..................... | 715/513 |
| 2004/0243928 A1 * | 12/2004 | Hesmer et al. | ................ | 715/505 |
| 2005/0050021 A1 * | 3/2005 | Timmons | ......................... | 707/3 |
| 2005/0256940 A1 * | 11/2005 | Henderson et al. | ........... | 709/219 |
| 2006/0005137 A1 | 1/2006 | Jolley | | |
| 2006/0075357 A1 * | 4/2006 | Guido et al. | .................. | 715/784 |
| 2006/0103651 A1 * | 5/2006 | Kessler et al. | ............. | 345/440.1 |
| 2006/0155682 A1 * | 7/2006 | Lection et al. | ..................... | 707/3 |
| 2006/0168540 A1 * | 7/2006 | Cejka et al. | ..................... | 715/786 |
| 2006/0212798 A1 * | 9/2006 | Lection et al. | ................ | 715/513 |
| 2007/0006084 A1 * | 1/2007 | Lection et al. | ................ | 715/744 |
| 2007/0055942 A1 * | 3/2007 | Hesmer et al. | ................ | 715/742 |
| 2007/0083821 A1 * | 4/2007 | Garbow et al. | ............... | 715/781 |

(Continued)

Primary Examiner — Thu Huynh
(74) Attorney, Agent, or Firm — Patents on Demand P.A.; Brian K. Buchheit; Scott M. Garrett (57) ABSTRACT

Portlet information can be updated by first identifying one or more portlets presented on a client. Each portlet can include an interface control that is iteratively updated from a remotely located data source. For each portlet, a presented and a hidden version of the interface control can be established. Each portlet can fetch data from the data source and use this data to update the hidden version of the interface control. The hidden version of the control can be updated using the fetched data. After the hidden version is updated, the hidden version can be switched with the presented version. Each portlet can have a portlet refresh rate and the steps of fetching data, updating the hidden version, and switching the hidden version with the presented version can be repeated to satisfy the portlet refresh rate.

18 Claims, 9 Drawing Sheets

(56) References Cited

U.S. PATENT DOCUMENTS

| | | |
|---|---|---|
| 2007/0113187 A1* | 5/2007 | McMullen et al. ............ 715/742 |
| 2007/0124460 A1* | 5/2007 | McMullen et al. ............ 709/224 |
| 2007/0174256 A1* | 7/2007 | Morris et al. ..................... 707/3 |
| 2007/0240063 A1* | 10/2007 | Cheng et al. .................. 715/741 |
| 2007/0256024 A1* | 11/2007 | Schell et al. ................... 715/762 |
| 2008/0040672 A1* | 2/2008 | Appleyard et al. ............ 715/742 |
| 2008/0072155 A1* | 3/2008 | Detweiler et al. ............ 715/729 |
| 2008/0126949 A1* | 5/2008 | Sharma ......................... 715/751 |

* cited by examiner

UPDATING PORTLET INTERFACE CONTROLS BY UPDATING A HIDDEN VERSION OF THE CONTROL AND THEN SWITCHING IT WITH A DISPLAYED VERSION

BACKGROUND

1. Field of the Invention

The present invention relates to the field of Web portals and portlet handling, and, more particularly, to updating portlet interface controls by updating a hidden version of the control and then switching the hidden version with a presented version, thereby reducing flicker and other potential updating problems.

2. Description of the Related Art

A Web portal is a Web site or service that offers a broad array of resources and information, such as e-mail, search engines, advertising, user-specific reports, personalized contact and task management functions, customized news feeds, local weather, and the like. A Web portal can include multiple Web portlets. Each Web portlet can be a reusable Web component that displays information to portal users from a designated source, which can be different from the source that provides information for the portal. An arrangement of portlets within a portal, a presentation of information within the portal, the responsiveness of this presentation, and other user perceived factors all contribute to the user experience of the portal.

A user's experience is often enhanced when interface controls, such as dials, charts, tickers, and the like, are used to present data. This is especially true when a user can customize the controls to provide alerts of important situations and/or can select particular controls to drill down information contained therein. Accordingly, the controls within portlets can present real-time updates to a user. The user can quickly digest the information conveyed by the controls and can detect important anomalies and respond in an appropriate fashion.

Unfortunately, conventional methods for updating portlet information can result in numerous substantial problems, such as flicker. Flicker often occurs when multiples of frequently updated interface controls exist in close proximity, each being associated with its own portlet. Each control requires continuous data updates (such as every 1 to 10 seconds), update processing, and a visual refreshing of the control to show the data updates. The frequency of control updates and related processes is typically independent of other control updates for other portlets. Additionally, each control typically consists of multiple elements, such as chart bars and values and/or dial positions, where the visual elements can be processed in sequence as element specific updates are received. When update and processing delays occur, a portion of the control elements are sometimes updated but a different portion of the control elements are not, resulting in a confusing visual experience.

Problems are escalated as the number of portlets increases, since a single and independent process is typically utilized on behalf of each portlet. Serialization of data requests (associated with different processes) can occur if the requests are made within the same time frame relative to the amount of time necessary to refresh an interface control. A manifestation of this problem is that the visual controls within portlets appear to be stalled from time to time and one or more updates can be skipped as the control refreshing is not performed within a refresh rate period established for the control. Instead of a relatively smooth refreshing of controls, the controls appear to "jump" from one step to another, which results in a distracting and non-appealing user experience. In extreme cases, data update problems among the portlets can overload a system, causing a portlet or Web browser to lock up completely.

Figure 1:
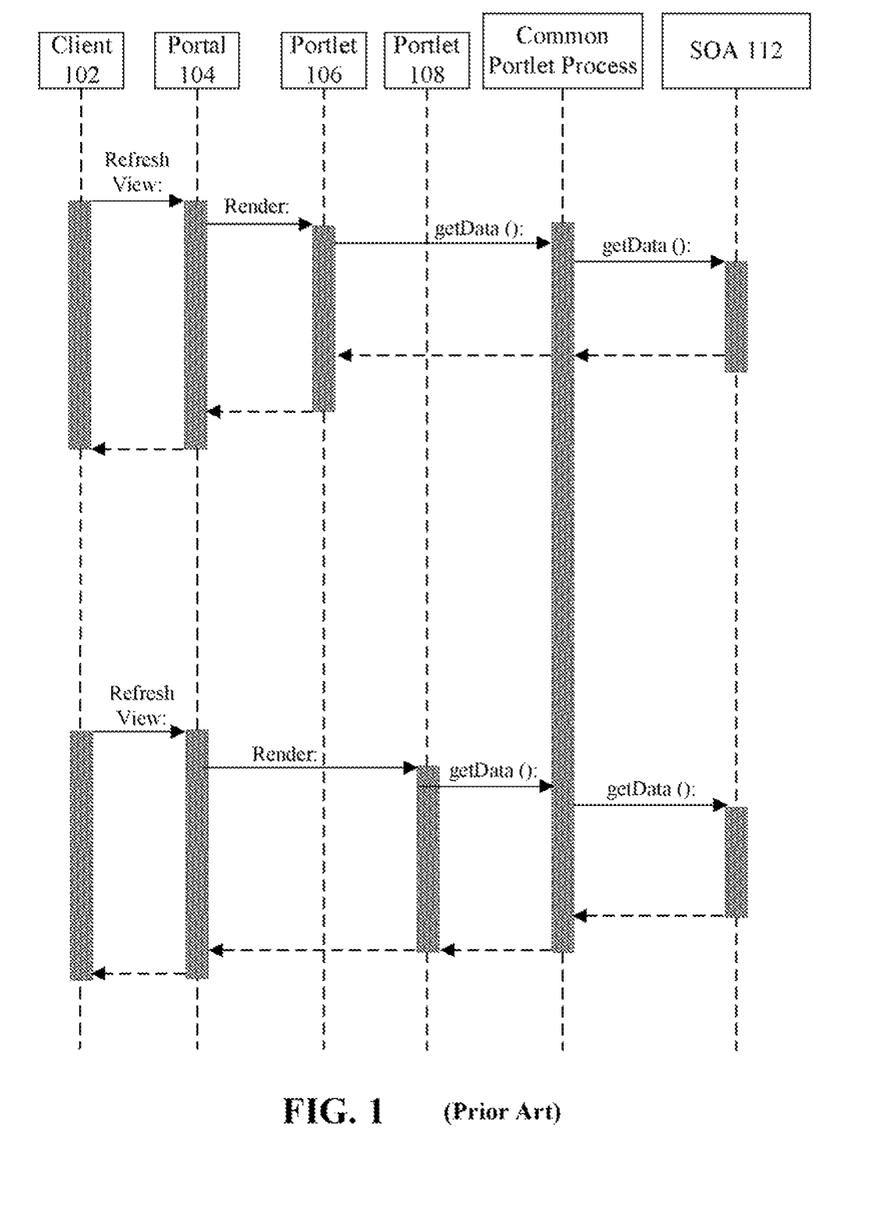
FIG. 1 shows the basic interactions executed to enable a client device to utilize one or more data sources linked to one or more portlets to produce a user experience for the portal.

FIG. 1 shows the basic interactions executed to enable a client device to utilize one or more data sources linked to one or more portlets to produce a user experience for the portal. From FIG. 1 it can be readily understood that portlet updates occur independent of each other with each portlet constantly polling data sources for updates. The constant polling for updates and receiving of responses that occur on a portlet-by-portlet basis can quickly overload a system or communication infrastructure to an extent that data updates are delayed, flickering occurs, portlets appear to stall, and lockups occur, thus detracting from the resultant user experience of the portal. While FIG. 1 assumes the data source used by the portlets is part of a Service Oriented Architecture (SOA) 112, the portlet communication pattern shown in FIG. 1 applies to portlets-data source communications in general and is not limited to a particular software architecture, such as SOA 112.

As shown, the client 102 portlets 106 and 108 of FIG. 1 can utilize JAVASCRIPTS to request that the portlets 106-108 be refreshed. The portal server 104 can create a process to handle retrieving data to update the portal 104. The portlets 106-108 can retrieve data from various components of the SOA 112. Each portlet 106-108 independently follows an equivalent update process. For example, a client 102 can request that information in a selected portal 104 to be refreshed. The portal 104 will render interface controls in portlet 106 or 108. This rendering can require data values be obtained from a portlet process, which can require information be obtained from the SOA 112. The SOA 112 sends responses back to the common portlet process, to the requesting portlet 106 or 108, which sends data to the portal 104, which properly renders/presents the updated information upon client 102.

SUMMARY OF THE INVENTION

The present invention discloses a portlet update solution that uses multiple versions of portlet controls, one version being presented and one or more other versions being normally hidden. A hidden version of a control can be updated using data fetched from a data source. When the hidden version is fully updated, this version can be switched with the currently presented version. As a result, an update for each portlet control occurs smoothly without flicker. The solution can utilize a client-side interaction engine to coordinate portlet updates. The interaction engine can provide a threading environment for concurrent fetch, rendering, and switching interactions, thus avoiding serialization issues that occur with conventional portlet update techniques.

The solution presented herein can be part of a highly scalable solution for presenting real-time information in portlets. For example, in one embodiment, communications between the interaction engine and a data source can occur through a portlet server that is capable of locally caching information from data sources and processing the same. Use of a portal server can bring real-time information closer to an end-user, therefore reducing latency of data retrievals and can minimize unnecessary and/or redundant traffic between clients and data sources. Further, the portal server can interact with a Service Oriented Architecture (SOA), where Web services are established between service providers (data sources) and the portal server. The Web services can be used to convey data updates. In one contemplated configuration, the portal server can cache update information asynchronously obtained from the data sources and can directly provide updated information to requesting portlets using the cache.

The present invention can be implemented in accordance with numerous aspects consistent with material presented herein. For example, one aspect of the present invention can include a method for updating portlet information. In the method, portlet information can be updated by first identifying one or more portlets presented on a client. Each portlet can include an interface control that is iteratively updated from a remotely located data source. For each portlet, a presented and a hidden version of the interface control can be established. Each portlet can fetch data from the data source and use this data to update the hidden version of the interface control. The hidden version of the control can be updated using the fetched data. After the hidden version is updated, the hidden version can be switched with the presented version. Each portlet can have a portlet refresh rate and the steps of fetching data, updating the hidden version, and switching the hidden version with the presented version can be repeated to satisfy the portlet refresh rate. In one embodiment, a portlet handling applet or AJAX script can handle updates for the portlets for the client.

Another aspect of the present invention can include a second method for updating portlets, which includes a step of identifying an interface control within a portlet that is bound to a data source. Two versions of the interface control can be established, one being a foreground version that is displayed on a client, the other being a background version that is hidden. The foreground version of the interface control can be displayed. A data update can be fetched from the data source. The background version can be updated in accordance with the data update. The background version can then be switched with the foreground version. The new foreground version of the interface control that includes the data update can be displayed.

Still another method of the present invention can include a system for updating portlet information. The system can include an interaction engine configured to handle updates for multiple portlets of a client. Each portlet can include an interface control, a presented version of the interface control, and a hidden version of the interface control. The interface control can be iteratively updated from a data source. The presented version of the interface control can be a version that is presented to a user of the client. The hidden version can be directly updated from data received from the data source. After an update occurs and before a new update is fetched from the data source, the hidden version can be switched with the presented version. Different refresh rates can apply to different portlets.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 2:
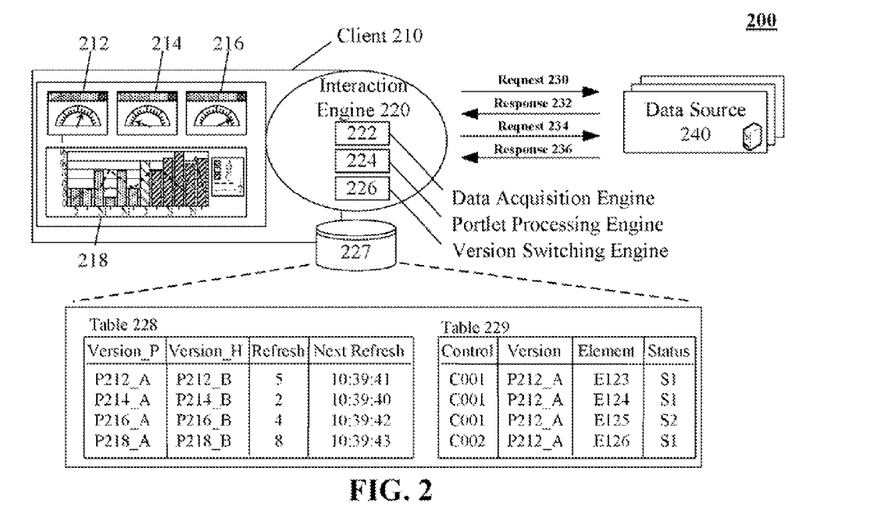
FIG. 2 is a schematic diagram of a system for updating portlet information obtained from data sources in accordance with an embodiment of the inventive arrangements disclosed herein.

FIG. 2 is a schematic diagram of a system 200 for updating portlet information obtained from data sources in accordance with an embodiment of the inventive arrangements disclosed herein. In system 200, a client 210 can include portlets 212, 214, 216, and 218, which are updated by interaction engine 220. Each portlet 212-218 can be bound to a data source 240, which it uses to refresh an interface control contained within the portlet 212-218. Each interface control of portlets 212-218 can have multiple versions, including a presented version and at least one hidden version. Interaction engine 220 can update the hidden version with data fetched from data source 240, which is then swapped with the presented version. This process can then be iteratively repeated. By first constructing a new and completely updated version of the updated interface control and then swapping that updated version with an outdated version of the control, a flickering effect is eliminated and/or reduced.

The interface control can be a graphical control, such as a dial, chart, slider, table, media streaming control, a ticker, and the like that summarizes information. The interface control can also include audio controls, such as speech presentation and processing controls, or any other control that receives continuous information updates from a data source 240. In one embodiment, interface controls can be interactively linked to other portlet contained information, such as a textual summary window or a detail section, which presents data values related to the control responsive to a user selection.

Client 210 can be a computing device capable of presenting Web content. Client 210 can include, but is not limited to, desktop computers, servers, mobile telephones, tablet computers, personal data assistants (PDAs), digital media players, and the like. A portal can be a Web site or gateway that serves as a starting point to other destinations on the Web. A portal provides a mechanism to aggregate information for users to provide a user experience, which can be customized for user preferences. The portal can contain content obtained form multiple data sources 240.

Data source 240 can be a computing device including software that delivers or serves content to one or more portlets 212-218. Different data sources 240 can be used by different portlets 212-218. A single portlet 212-218 can also gather data from multiple data sources 240, such as when different controls within a portlet are bound to different data sources. Data source 240 can be associated with an Internet Protocol (IP) address and/or domain name, which is referenced by an associated portlet 212-218. Data source 240 can serve Web pages and/or can be providers of one or more Web services.

Interaction engine 220 can include client-side application code that is designed to interact with a server. The interaction engine 220 can be associated with a Web page, such as the portal including portlets 212-218. In one embodiment, the interaction engine 220 can be implemented as J2EE compliant software component that runs in the context of a Web application on client 210. For example, the interaction engine can include an applet, a JAVASCRIPT, an Asynchronous JAVASCRIPT and XML (AJAX) script, and the like.

The interaction engine 220 can handle update requirements for multiple portlets 212-218. The interaction engine 220 can be capable of multi-threaded operations, where each thread can be associated with a portlet 212-218 data update operation. For example, different threads spawned by interaction engine 220 can be associated with update request 230 and update request 234. Each of the update requests 230 and 234 can be a request to receive data from data source 240, which is used to update one or more portlets 212-218. The data updates can be provided to interaction engine 220 in responses 232 and 236.

In one embodiment, the interaction engine 220 can include a data acquisition engine 222, a portlet processing engine 224, and/or a version switching engine 226. The interaction engine 220 can also access a local data store 227, which can store information used by interaction engine 220, such as data shown in illustrative table 228 and 229.

The data acquisition engine 222 can handle specifics for obtaining information from data source 240. For example, the data acquisition engine 222 can ascertain data requirements for each portlet 212-218 and can determine required refresh rates, which can vary from portlet-to-portlet. Typical refresh rates for real-time and near real-time data can be between one (1) and ten (10) seconds. When audio/video is streamed from a data source 240, each update can include a packet of media content of sufficient duration to maintain a continuous playback until a nest packet is obtained in a following refresh cycle.

The portlet processing engine 224 can perform necessary operations to incorporate acquired data into a portlet control. The portlet processing engine 224 can, for example, perform operations to convert raw data into a dial setting of a dial interface control. The portlet processing engine 224 can then visually render the updated dial interface control in a hidden version of the interface control. Hence, the portlet processing engine 224 can use data from data acquisition engine 222 to update a hidden version of a control before that version of the control is presented to a user. The portlet processing engine 224 can also incorporate user specific settings into an interface control.

The version switching engine 226 can switch a hidden version of a control and a presented version of a control. The switching can occur after a data update has been performed on the hidden control. For the sake of simplicity, examples presented throughout the present disclosure show two versions, a hidden and a presented version, of a control. The invention is not limited in this regard, however, and multiple hidden versions can exist. In such a case, the version switching engine 226 can establish an ordered queue of versions, where the version at the "top" of the queue can be swapped with the presented version.

Data contained within tables 228 and 229 can be used to illustrate system 200 in operation. As shown in table 228, each portlet 212-218 can be associated with a presented version (Version_P) and a hidden version (Version_H). Each portlet 212-218 can further have a characteristic refresh time, such as five, two, four, and eight seconds, as shown. A next refresh time, which can be based upon a system clock, can be used to ensure that portlet data is updated in accordance with the refresh rate.

As shown in table 229, each version of a portlet control (C001 and C002) can have multiple elements (E123, E124, E125, and E126). Each portlet version (P212_A) can include one or more controls (C001-C002). Additionally, each element can have an associated status (S1-S2). The status can indicate whether the portlet processing engine 224 has successfully updated an element based upon a new update obtained from data acquisition engine 222. Once all updates are complete, as indicated by the status, then the version switching engine 226 can switch a newly updated and presently hidden version with an outdated but currently shown version of the control.

For example, after portlet processing engine 224 has updated P212_B with new information, the version switching engine 226 can swap P212_B and P212_A, so that P212_B is now the presented version and P212_A is the hidden version. The cycle can repeat, with new data being received from data source 240.

It should be appreciated that numerous techniques can be used to implement the presented and hidden version of the interface controls. For example, a Hypertext Markup Language (HTML) DIV tag can be used to establish separate sections in an HTML document for different versions of an interface control. Hidden versions of an interface control can be placed in a background of an associated portlet 212-218. A presented version of an interface control can be placed in a foreground of the associated portlet 212-218.

Figure 3:
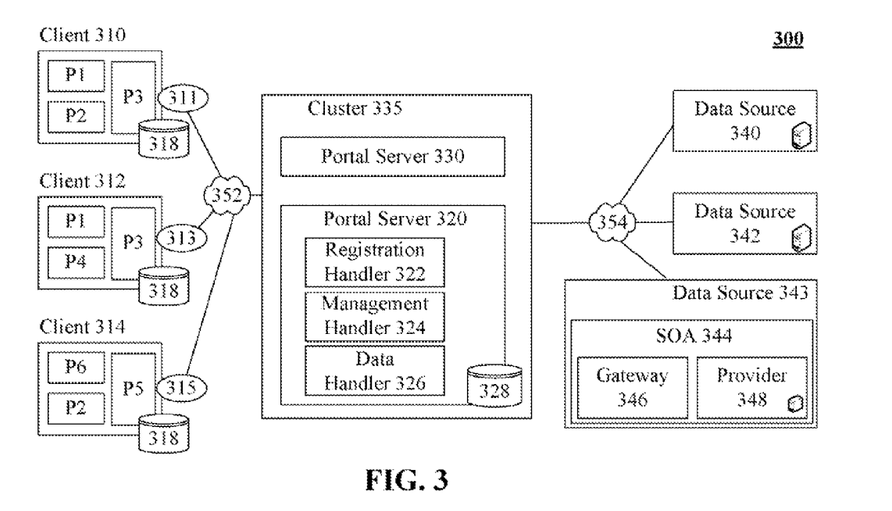
FIG. 3 is a schematic diagram of a system including a portal server for updating portlet information obtained from data sources in accordance with an embodiment of the inventive arrangements disclosed herein.

FIG. 3 is a schematic diagram of a system 300 including a portal server 320 for updating portlet information obtained from data sources in accordance with an embodiment of the inventive arrangements disclosed herein. The portal server 320 can handle information updates for clients 310, 312, and 314, each presenting information within one or more portlets P1-P6. Each client 310-314 can have an interactive engine 311, 313, and 315, which is used to perform updates, as described in system 200. A local data store 318 can be used by the interactive engines 311, 313, and 315 to store data for updating the portlets P1-P6. Portlet P1-P6 information can be obtained from one or more data source 340, 342, and 343. Networks 352 and 354 can communicatively link clients 310-314 and data sources 340-343 to portal server 320.

A portal can include one or more portlets P1-P6. Each portlet P1-P6 can be a pluggable user interface component. Different portlets P1-P6 can present content derived from different data sources 340-343. For example, portlets P1 and P2 can present data originating at data source 340. Portlets P3 and P4 can present data originating at data source 342. Portlets P5 and P6 can present data originating at data source 343.

Data source 343 can be configured in accordance with a Service Oriented Architecture (SOA) 344. The SOA 344 can provide a consistent, reusable method for integrating any type of information consumer with any business process or data provider 348. In SOA 344, services can be self-contained, reusable software modules with well-defined interfaces and can be independent of applications and the computing platforms on which the services run. Data provider 348 can be a data provider that updates data for one or more of the portlets P1-P6. Data can pass between service provider 348 and network 354 through service gateway 346.

The portal server 320 can provide data and can function as a communication intermediary between the clients 310-314 and data sources 340-343. One function of the portal server 320 is to provide real-time information to appropriate ones of the interaction engines 311-315, which can require constant updating. To facilitate this updating, the portal server 320 can cache information from the data sources 340-343 in data store 328. The cached data can be used to directly respond to data update requests. The portal server 320 can update information in the data store 328 on an iterative basis to ensure data currency.

For example, a data update for portal P1 can be required by client 310 and 312, which would normally be obtained from data source 340 directly. Instead, portal server 320 can periodically and/or intermittently obtain updates for portlet P1 from the data source 340 and place update results in data store 328. Whenever client 310 or 312 requires updates to P1, these updates can be directly obtained from data store 328. This arrangement can push data updates closer to the clients 310-314 and can minimize data update requests handled by data source 340 and network 354. Consequently, the clients 310-314 can experience a quicker response time, while load upon network 354 and data source 340 is reduced. The solution is highly scalable and also brings real-time information closer to the end-user, therefore reducing latency of data retrievals.

In another example, the portal server 320 can consolidate common types of real-time information. For example, portal P3 and P4 can both obtain update information from data source 342. These data updates can be for related information. Portal server 320 can aggregate the information required by portlets P3 and P4 into a single data set, which may have a coarser granularity level than non-aggregated data sets associated with P3 and P4. Portal server 320 can then intermittently retrieve data updates for the aggregated data set, which are placed in data store 328. Data requests from portlets P3 and P4 can be directly answered using the aggregated data set information stored in data store 328.

In still another example, the portal server 320 can retrieve data for portlets P5 and P6 from service provider 348. A first time that a data update is received from client 310-314 for portlets P5 and/or P6, the portal server 320 can establish a new data acquisition service designed to retrieve the necessary information from provider 348. The service can iteratively update the information, placing the updated information in data store 328. Thus, portal server 320 can respond to update requests related to portlets P5 and P6 directly using updated information stored in the data store 328. So long as one or more clients 310-314 require data updates related to portlets P5 and/or P6, an associated service will be maintained between portal server 320 and provider 348 ensuring data currency.

Portal server 320 can include registration handler 322, management handler 324, data handler 326, and data store 328. The registration handler 322 can register real-time information required by each portlet P1-P6 as well as a frequency of the real-time data retrieval interval. The registration handler 322 ensures that updates occur between portal server 320 and an associated data source 340-343 to ensure the frequency requirements of the clients 310-314 are satisfied.

Management handler 324 receives data requests from portlets P1-P6 and responds to the same. When necessary, management handler 324 can spawn new data acquisition processes, which execute in data handler 326. Additionally, management handler 324 can manage relationships between aggregated data sets and individual portlets P1-P6, which receive data updates based upon an aggregated data set.

Data handler 326 can establish data acquisition processes and/or threads to acquire data of a specified type from a data source 340-343. The data acquisition processes of data handler 326 can be synchronous and/or asynchronous with data requests from clients 310-314. When asynchronous, data store 328 can be used to cache retrieved data.

Networks 352 and 354 can include any hardware, software, and firmware necessary to convey data encoded within carrier waves. Data can be contained within analog or digital signals and conveyed though data or voice channels. Networks 352 and 354 can include local components and data pathways necessary for communications to be exchanged among computing device components and between integrated device components and peripheral devices. Networks 352 and 354 can also include network equipment, such as routers, data lines, hubs, and intermediary servers which together form a data network. Networks can also include circuit-based communication components and mobile communication components, such as telephony switches, modems, cellular communication towers, and the like. Each of the networks 352 and 354 can include line based and/or wireless communication pathways.

Data stores 318 and 328 can be a physical or virtual storage space configured to store digital information. Data stores 318 and 328 can be physically implemented within any type of hardware including, but not limited to, a magnetic disk, an optical disk, a semiconductor memory, a digitally encoded plastic memory, a holographic memory, or any other recording medium. Each of data stores 318 and 328 can be a standalone storage unit as well as a storage unit formed from one or more physical devices. Additionally, information can be stored within data stores 318 and 328 in a variety of manners. For example, information can be stored within a database structure or can be stored within one or more files of a file storage system, where each file may or may not be indexed for information searching purposes. Further, data store 318 and/or 328 can utilize one or more encryption mechanisms to protect stored information from unauthorized access.

Figure 4:
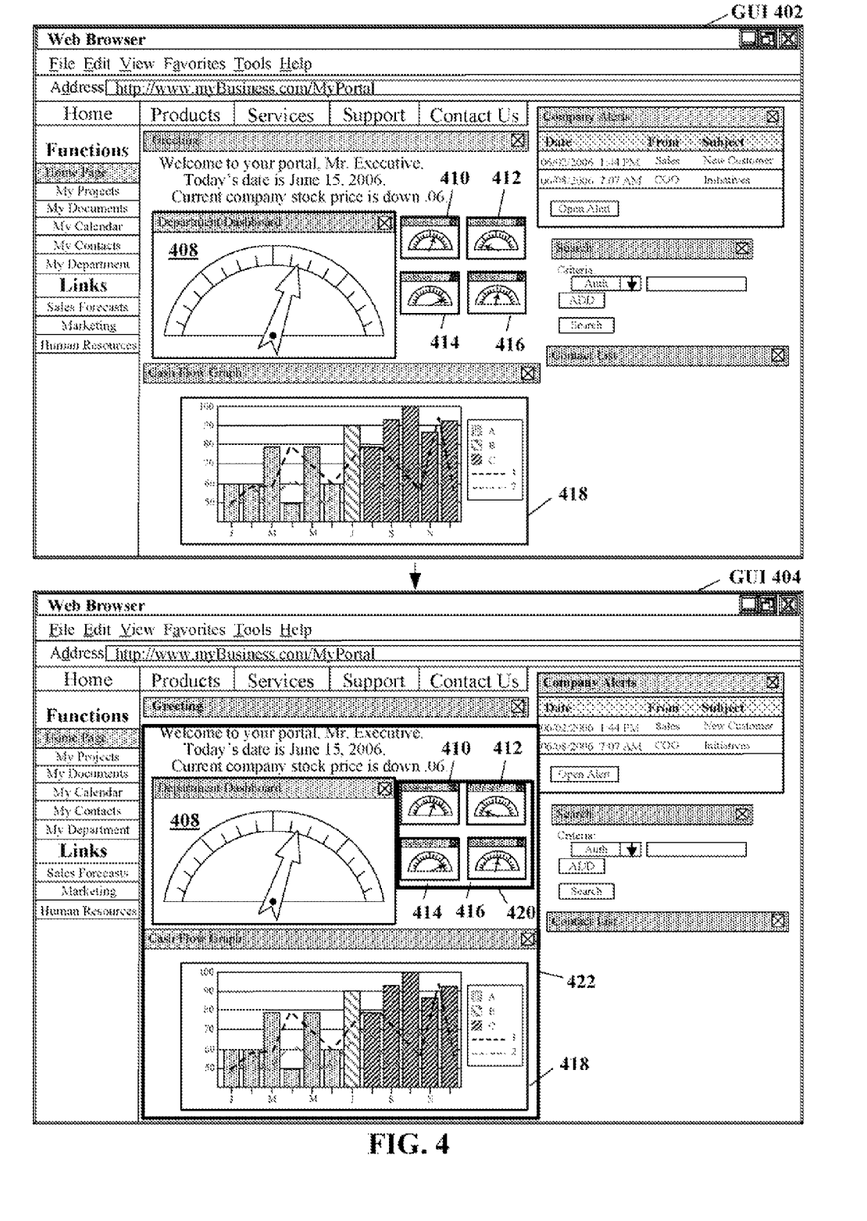
FIG. 4 shows graphical user interfaces (GUIs) containing multiple portlets, where information required by the multiple portlets is aggregated by a portal gateway in accordance with an embodiment of the inventive arrangements disclosed herein.

FIG. 4 shows graphical user interfaces (GUIs) 402 and 404 containing multiple portlets, where information required by the multiple portlets is aggregated by a portal gateway in accordance with an embodiment of the inventive arrangements disclosed herein. GUI 402 shows the portal before data aggregation occurs and GUI 404 shows the same portal after aggregation.

The portal can include portlets 408, 410, 412, 414, 416, and 418, each presenting current company performance statistics. The performance statistics are presented using different GUI controls, which include gauges, charts, summaries, tickers, and the like. The GUI controls can be designed to aid a user to quickly digest the company information. The performance statistics and presentation controls can be customized by a user to suit that user's needs. The controls can each include a hidden version and a presented version, where the hidden version is swapped with the presented version after an update occurs. Information displayed in portlets 408-418 can be updated in real-time. The GUI controls can be automatically updated as performance information upon which the controls are based changes.

As shown, portlets 408-416 can present company performance information as a series of gauges. Portlet 418 can show a performance chart. Conventionally, each of the gauges shown in portlets 408-416 as well as the chart shown in portlet 418 will be directly and independently linked to a data source. Multiple real-time information streams will be required to keep the portlet 408-418 information updated. Relying on multiple real-time streams for each portlet can consume substantial computing resources and is somewhat inefficient. Further, using multiple real-time streams for each portlet 408-418 creates scalability problems and data latencies can be expected. Any latencies between the data source and a user of GUI 402 can result in the GUI controls flickering, a portal appearing to "lock-up", and other user noticeable affects that decrease the overall user experience. Use of a portal server, as shown in system 300, can decrease the scalability problems and can reduce latencies as direct data updates for portlets 408-418 can be provided by a portal server.

The portal server further reduces unnecessary traffic and increases infrastructure scalability by aggregating data required by multiple portlets into a common data set, as shown in GUI 404. In GUI 404, one aggregated data set 420 can be created for portlets 410-416. A different data set 422 can aggregate data associated with data set 420 and with portlets 408 and 418. Once a data set 420 or 422 is created, the portal server can create a link with a data source that updates the data set 420 or 422. This link can satisfy the data update requirements of multiple component portlets and/or data sets to minimize traffic between the portal server and the data source.

It is assumed that the GUI controls for portlets 408-418 and the information contained therein is based upon a definable data superset (data set 422) and that information for portlets 410-416 are based upon a definable data superset (data set 420). The values of the GUI controls can be based on a combination of relatively fixed data (baseline data) and data included in an updated data set 420 and/or 422. The baseline data can be locally stored upon a client machine and/or a portal server to minimize unnecessary requests to a data source. Similarly, processing operations required to convert raw company data (of the baseline data and/or data set 420-422) to values needed by the GUI controls can be performed by a client machine and/or portal server.

Notably, the portal server can ascertain the data requirements for each of the portlets and can ensure portlet-to-gateway updates are performed with a proper frequency using a gateway registration handler as well as an interaction engine, as previously described. A management handler of the portal server can coordinate between an aggregated data set 420-422 and each of the portlets 408-418 and/or processes handled by a registration handler for various ones of the portlets 408-418. A data handler of the portal server can ensure data updates between data sources and the gateway are iteratively preformed with a suitable frequency to maintain data currency.

Figure 5:
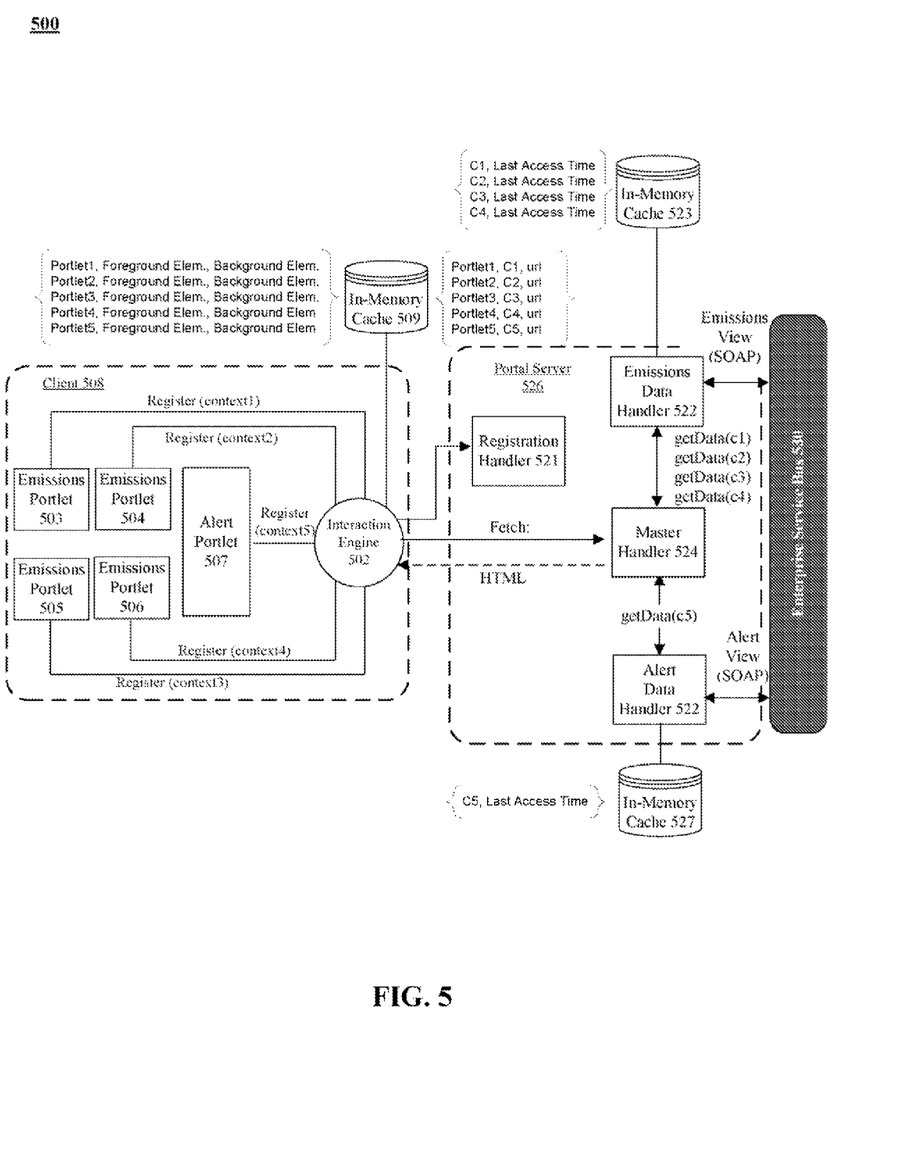
FIG. 5 is a schematic diagram of a system for updating portlets in accordance with an embodiment of the inventive arrangements disclosed herein.

FIG. 5 is a schematic diagram of a system 500 for updating portlets in accordance with an embodiment of the inventive arrangements disclosed herein. System 500 can include client 508 that uses portal server 526 as an intermediary for obtaining enterprise data from an enterprise service bus via enterprise sendee bus 530. Portlets 503-506 are portlets including a gauge interface control that presents emissions data. Portlet 507 presents alert information. Each of the portlets 503-507 are regularly updated by data fetched from an enterprise data source via bus 530.

Refresh operations for the portlets 503-507 can be triggered by JAVASCRIPTS, AJAX scripts, and the like and can be handled by a local interaction engine 502. Interaction engine 502 can be associated with an in-memory cache 509, which is a data store for storing information needed to update portlets 503-507. For example, the cache 509 can store foreground control elements (visible or presented elements) and background control elements (hidden) for each portlet 503-507. The cache 509 can specify data sources that provide information to the portlets 503-507, which is shown in system 500 by specifying the URLs for the data sources.

Engine 502 can interface with portal server 526, which in turn interfaces with enterprise service bus 530, from which update data is obtained. For example, each of the portlets 503-507 can be registered with registration handler 521. Requests to fetch data can be conveyed through master handler 524, which provides data responses. The master handler 524 can use one or more data handlers 522 to obtain enterprise data. Each of the data handlers 522 can use a local cache 523 and/or 527 to ensure updates are obtained with an appropriate frequency, as specified by the registration handler 521.

It should be noted that each portlet 503-507 can register different data update contexts, such as context 1 (C1) for portlet 503, context 2 (C2) for portlet 504, context 3 (C3) for portlet 505, context 4 (C4) for portlet 506, and context 5 (C5) for portlet 507. Different data update tasks can be identified by their associated contexts. Different types of data handlers 522 can be associated with different types of data contexts. For example, portlets 503-506 can have contexts (C1-C4) that are associated with emissions, which are handled by an emissions data handler 522. A cache or data store 523 can record when each context (C1-C4) was last updated and/or accessed. In another example, portlet 507 can have a context (C5) that is associated with alerts, which is handled by an alert data handler 522. A cache or data store 527 can record when C5 was last updated and/or accessed.

Figure 6:
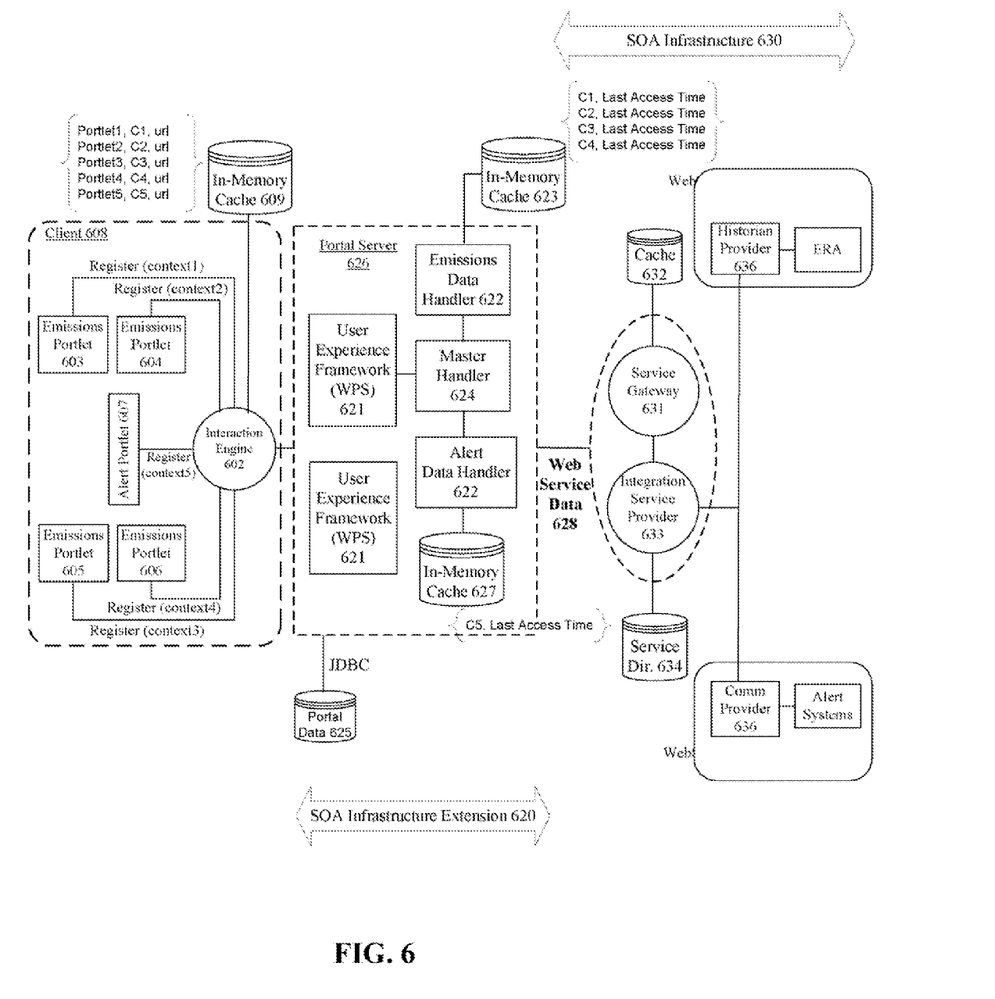
FIG. 6 is a schematic diagram of a system showing a SOA infrastructure that is extended to include a portal server in accordance with an embodiment of the inventive arrangements disclosed herein.

FIG. 6 is a schematic diagram of a system 600 showing a SOA infrastructure 630 that is extended 620 to include a portal server 626 in accordance with an embodiment of the inventive arrangements disclosed herein. In system 600, one or more clients 608 can include portlets in which enterprise data is presented. The enterprise data can be obtained from enterprise data sources. The enterprise data sources can include data provided by providers 636, which utilize application servers 635 to serve application data for the enterprise. The application data can be provided to portal server 626 as one or more Web services 628. Service gateway 631 can be a communication intermediary between the portal server 626 and the SOA infrastructure 630. Portal server 626 can be optionally implemented as a cluster of portal servers (not shown) to provide redundancy and to enable resilient operation of system 600 should one or more portal servers 626 fail.

Enterprise information obtained via Web services 628 can be stored by portal server 626 in portal data store 625. The information in portal data store 625 can be continuously updated in accordance with established Web services 628 to ensure that portal data store 628 always includes current information. The continuous updates can occur frequently enough to provide accurate real-time data to clients 608 directly from the data store 625.

Each portlet 603-607 of client 608 can utilize interaction engine 602 to interface with the portal server 626. Data store 609 can be used to store information specifying data sources for updating the portlets 603-607, such as URLs for associated Web sites. Data store 609 can also separately store and track foreground (presented) version information for the portlets 603-607 and background (hidden) version information.

Client 608 can communicate with portal server 626 via one or more edge servers (not shown). Authorization engines (not shown) can ensure security of portlet data. The portal server 626 can optionally include user experience engines 621 that interface with specific client 608. The user experience engines 621 can be communicatively linked to registration handler (not shown), master handler 624, and data handler 622, as shown. Each data handler can be associated with a memory cache 623 and/or 627, which stores data update frequency information. Handlers can together ensure that data presented within client 608 portlets and obtained from providers 636 is continuously updated.

In one embodiment, user experience engines 621 can customize enterprise content for a particular communication channel, such as a customer channel, an employee channel, a management channel, and IT administrator channel, and the like. The communication channels can also be linked to different market channels, such as storefront systems, kiosks, e-retailing Web sites, and the like. Accordingly, the user experience engines 621 can customize streams of enterprise data obtained from an enterprise infrastructure for different front-end systems. Segmenting enterprise data from different front end systems used by clients 608 in such a loosely coupled fashion ensures that enterprise data can be utilized by different separately customizable systems without negatively affecting back-end systems.

It should be noted that the base SOA infrastructure 630 of system 600 is a specific architecture for providing enterprise services and data that combines simple, loosely-coupled advantages of SOA based systems with more traditional methods of integration techniques, details of which are the subject matter of other inventive solutions. Infrastructure 630 can be extended 620 to include the portal server 626 concept.

System 600 represents one of many contemplated embodiments of the present portlet enhancement solution and one contemplated application for portal server 626. The invention is not to be construed as limited to arrangements shown in system 600, and the portal server 626 can be used in any of a variety of situations and systems, as described in system 200, system 300, and throughout this document.

To elaborate upon system 600, the service gateway 631 of SOA infrastructure 630 can provide enterprise service access to channel applications executing on clients 608. The service gateway 631 can be responsible for accepting SOAP formatted XML requests from local application servers 635. It then can discover the appropriate service provider 636 for each request and can pass the request to the appropriate provider 636, adding any additional meta-data into the XML request as needed.

These transformations are usually common activities that all service requests must have performed before they are received by service provider 636. The service gateway 631 can serve as a central component that performs these functions reducing the burdens of the channel client 608 or application. The gateway 631 may bind to the provider dynamically or through well-defined communication channels. The service gateway 631 can also store bound provider data within a dynamic runtime cache 632. The gateway 631 can directly respond to portal server 626 requests using data stored in the dynamic runtime cache 632. Providers 636 can receive data updates from an information source, which it can propagate to bound data elements, such as those within the dynamic runtime cache 632. A subscription methodology can be used to keep the information in the dynamic runtime cache 632 current.

In the event of an unknown service request, the service gateway 631 can request a binding location from an integration service provider 633. The integration service provider 633 can be a system of record for all valid service requests. Once found, the request will be passed to the appropriate endpoint. The service gateway 631 can store the location of the provider 636 and bind directly on subsequent requests.

The service directory 634 can be an online directory that provides a uniform way for businesses and organizations to describe available services, service capability, required interface parameters, and output parameters resulting from the described services. The services of the directory 634 can include all services accessible via service gateway 631. In one embodiment, the service directory 634 can use an extensible Markup Language (XML) based directory of Web services. Web services specified in the service directory 634 can be described using a Web services description language (WSDL). The service directory 634 can be a universal description discovery and integration (UDDI) directory.

Inner workings of system 600 can be shown using illustrative examples. In one example, a portlet client can utilize a JAVASCRIPT or similar code to request a refresh of portlet data. Engine 602 can receive the request and can manage portlet 603-607 update details for client 608. Engine 602 can generate an update request that can pass through an edge server to an authorization server, which ensures that the requesting client is authorized to access portal server 626. The request, can be received by a registration handler, which enables registration of real-time information types. The registration handler can trigger master handler 624 to create threads to obtain updated data from a data source. Each thread of the master handler 624 can have a corresponding data updating thread created within the data handler 622. Each data handler 622 thread can continuously and asynchronously retrieve data through the SOA infrastructure 630. Data retrieved from the data handler 622 can be placed in portal data store 625. The master handler 624 can provide the update information for the requesting portlets 603-607 as needed via engine 602.

In another example demonstrating portal server resiliency, a portlet 603 of client 608 can utilize a JAVASCRIPT to request engine 602 update the portlet 603. The client 608 can already have authorized itself, so that the refresh request can pass through the edge server and authorization server to an assigned portal server 625. This previously used portal server 625 can be unavailable, which can cause the refresh request to be automatically conveyed to a backup node. A process to handle the page/portal that includes the portlet from which the request was received can be initialized on the backup node. Handler threads for handlers 622 and 624 can execute. The backup node can obtain data directly from portal data store 625 if available. The data handler 622 and associated threads can continuously and asynchronously retrieve real-time data through the SOA infrastructure 630 for the portlets being handled by the backup node. The refresh request can be responded to by the backup node using either previously cached information, when available, or the real-time data obtained through the SOA infrastructure 630. Should the original portal server 626 become available, responsibilities for handling portlet requests from clients 608 can be seamlessly transferred from the backup node to the original portal server 626.

Figure 7:
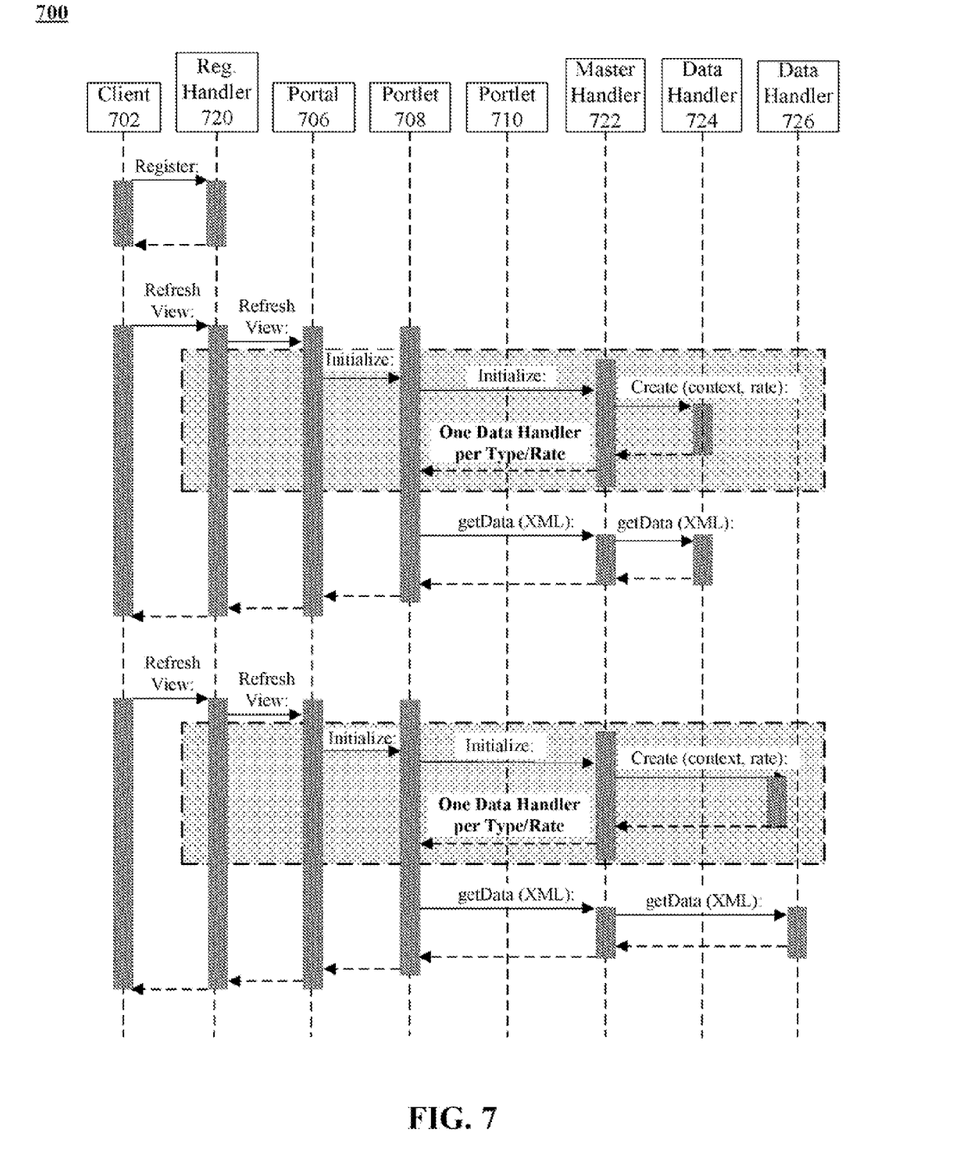
FIG. 7 is a flow diagram depicting components and interactions required for initializing a portal page in accordance with an embodiment of the inventive arrangements disclosed herein.

FIG. 7 is a flow diagram 700 depicting components and interactions required for initializing a portal page in accordance with an embodiment of the inventive arrangements disclosed herein. Specifically, diagram 700 shows interactions between a client 702 with a portal 706 that includes portlets 708 and 710. Client 702 side handling of the data update can be managed by an interaction engine, such as an applet or AJAX script. Each of the portlets 708-710 can be updated using a portal server that includes registration handler 720, master handler 722, and data handlers 724 and 726.

In diagram 700, client 702 can register itself with registration handler 720. Registration can initialize each portlet 708-710 and the type of data required by each portlet 708-710. Once registered, the registration handler 720 can manage a portlet context for future requests. On a first refresh request issued by client 702 of a particular type, the portal server can initialize the master handler 722. The master handler 722 can spawn appropriate processes and/or threads, such as data acquisition threads spawned in data handler 724. Each data type/data context/refresh rate combination can have an associated data handler thread and/or process. Portlet 708 can then retrieve data from the master handler 722, which in turn gets the latest data from the data handler 724 servicing portlet 708.

On another refresh issued by client 702 for a different type of update, the portal server can again initialize the master handler 722. Communications between the portal server and the client 702 can occur through an interaction engine regardless of the portlet 708-710 being updated. The master handler 722 can again spawn appropriate data acquisition threads/processes for the different update type. The new type can be handled, for example, by a process of data handler 726. The portlet 708 can then retrieve data from the master handler 722, which in turn can acquire the latest data from the data handler 726 serving this type of data.

Figure 8:
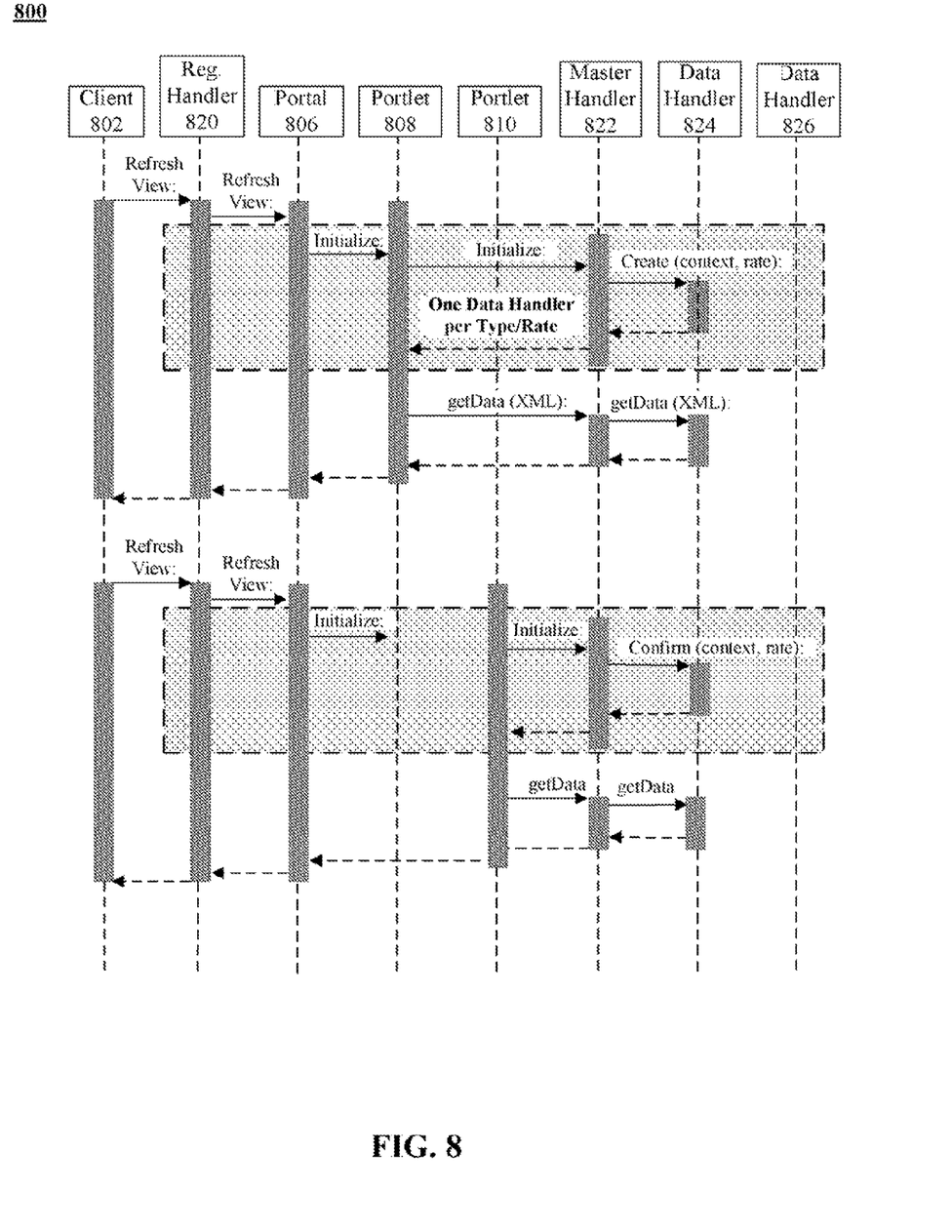
FIG. 8 is a flow diagram depicting components and interactions required for initializing a portal page in accordance with an embodiment of the inventive arrangements disclosed herein.

FIG. 8 is a flow diagram 800 depicting components and interactions required for initializing a portal page in accordance with an embodiment of the inventive arrangements disclosed herein. Specifically, diagram 800 depicts interactions required when a portlet makes a refresh request for the same type of information with different refresh rates. An interaction engine, such as engine 220 from system 200, can handle client-side interactions.

In diagram 800, client 802 can register with registration handler 820, which permits handler 820 to manage portlet contexts for future requests. A first data refresh request of a particular type can be issued by the client 802. In response, the portal server can initialize a master handler 822. The master handler 822 can cause data handler 824 to initiate a process that ensures data is acquired form a source at a determined frequency. The portlet 808 can then iteratively retrieve data from master handler 822, which receives the required data in turn from data handler 824.

Portlet 810 can also issue a refresh request for the same type, which is sent to master handler 822. The master handler 822 can identify that an existing process is in place to acquire needed information for portlet 810. In one embodiment, the process used to acquire data for portlet 808 can be a process that retrieves an aggregated data set, which can be used to satisfy data requirements of multiple portlets. For instance, the previously created process managed by data handler 824 can acquire data for data set 420 shown in FIG. 4, where portlets 808-810 represent instances of portlets 410-416. Once the existing process is identified, the master handler 822 can confirm that the data refresh rate of the existing process is sufficient for portlet 810. Otherwise, the frequency of the existing data acquisition process can be appropriately adjusted. Portlet 810 can retrieve data updates from master handler 822, which in turn receives them from data handler 824.

Figure 9:
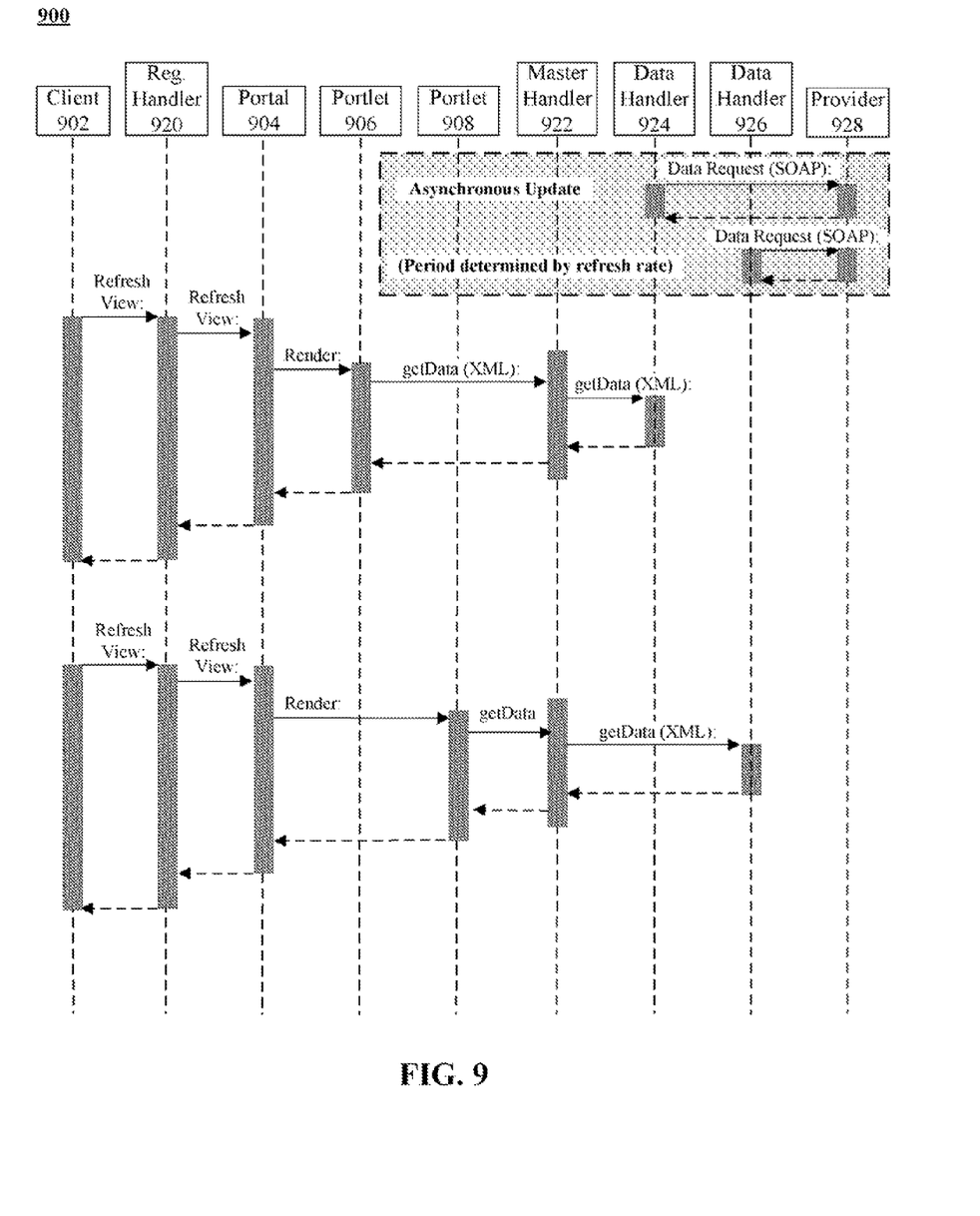
FIG. 9 is a flow diagram depicting components and interactions required for initializing a portal page in accordance with an embodiment of the inventive arrangements disclosed herein.

FIG. 9 is a flow diagram 900 depicting components and interactions required for initializing a portal page in accordance with an embodiment of the inventive arrangements disclosed herein. Diagram 900 shows that the data acquired by data handlers 924 and 926 from a data source can occur asynchronously with data update requests from client 902. For example, the data handlers 924 and 926 can continuously update a local data store, such as data store 328 of FIG. 3. Content from the local data store can be used to respond to portlet requests.

In diagram 900, data handler 924 and 926 can issue data requests (such as SOAP requests) to a data source, such as provider 928. In one embodiment, a polling methodology can be used by the data handlers 924-926 to obtain information, where a polling period can be determined by client 902 requirements. The polling period must be equal or less than the shortest data refresh period required by a client 902.

In another embodiment, a subscription methodology can be used by the data handlers 924-926. That is, data subscriptions can be established between the data handlers 924-926 and the data providers 928. Whenever the data provider 928 detects an update of content for which a subscription exists, the update can be pushed to an appropriate data handler 924-926. The updates can then be locally cached.

Whenever a portal 904 update process requires that portlet 906 data be refreshed, master handler 922 can be queried. Master handler 922 can request response data from data handler 924, which uses locally cached information to respond. Similarly, a different portlet 906 can submit a request to master handler 922 for a different data context, this one handled by handler 926. Master handler 922 can request response data from handler 926, which can use previously cached data to respond, as shown.

Figure 10:
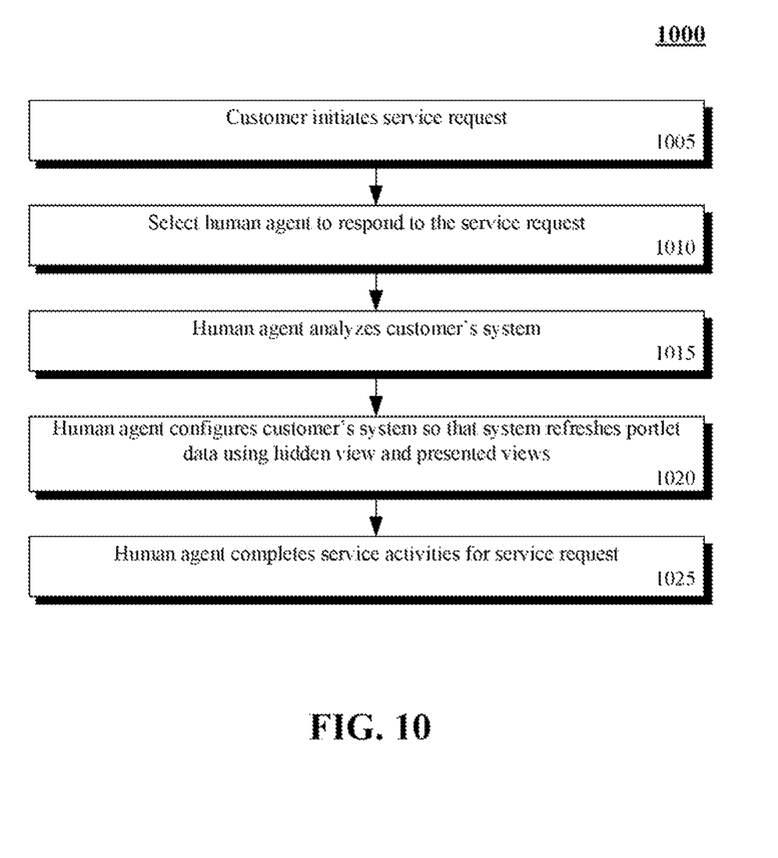
FIG. 10 is a flow chart of a method, where a service agent can configure a system that switches between hidden portlet controls and presented portlet controls to update portlets in accordance with an embodiment of the inventive arrangements disclosed herein.

FIG. 10 is a flow chart of a method 1000, where a service agent can configure a system that switches between hidden portlet controls and presented portlet controls to update portlets in accordance with an embodiment of the inventive arrangements disclosed herein. Method 1000 can be preformed in the context of system 200.

Method 1000 can begin in step 1005, when a customer initiates a service request. The service request can be a request for a service agent to configure or troubleshoot a software system that refreshes portlets. The system can fetch data from a data source and use that data to update a hidden version of a portlet control, which is then swapped with a presented version of the control. The system can also utilize a portal server as detailed herein. In step 1010, a human agent can be selected to respond to the service request. In step 1015, the human agent can analyze a customer's current system and can develop a solution. In step 1020, the human agent can configure the customer's system so that the system can refresh portlets. The human agent can, for example, configure the customer's system to utilize portlet update engines as described herein. If the system includes a portal server, the portal server can service multiple clients and can be arranged in a cluster to ensure resiliency. Further, the portal server can obtain information for refreshing the portlets from any data source, including data providers of a SOA. In step 1025, the human agent can complete the service activities.

It should be noted that while the human agent may physically travel to a location local to adjust the customer's computer or portal server, physical travel may be unnecessary. For example, the human agent can use a remote agent to remotely manipulate the customer's computer system or portal server as necessary.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. Method for updating portlets comprising:
   identifying, for each of a plurality of portlets displayed at a client, an interface control within the portlet that is bound, via a network, to a data source;
   establishing, for each of the plurality of portlets, two versions of the interface control, one being a foreground version that is displayed on a client, the other being a background version that is hidden;
   displaying the foreground version of the interface control;
   maintaining at the client a table having the foreground version, the background version, and refresh times for each of the plurality of portlets, wherein the refresh times indicate how often and when next the associated portlet is to be refreshed, and wherein the refresh times vary among the plurality of portlets;
   fetching data update by the client for each of the plurality of portlets at times dictated by their respective refresh times from the data source to which each respective portlet is bound;
   updating the background version at the client for each of the plurality of portlets in accordance with the data update for each respective portlet upon fetching the data update for each respective portlet;
   switching the background version and the foreground version in the table at the client of each respective portlet upon the updating of the background version of each respective portlet, wherein the switching causes the background version to become a new foreground version to be displayed and the foreground version to become a new background version to be updated; and
   after the switching, displaying the new foreground version of the interface control of each respective portlet at the client, wherein after the switching the new foreground version includes the data update.

2. The method of claim 1, further comprising:
   maintaining in the table a portlet control version for each portlet interface control.

3. The method of claim 1, wherein portlet refresh rate for each respective portlet is between one second and ten seconds.

4. The method of claim 1, wherein a Web page including the portlet comprises hypertext markup language for each of the hidden and presented versions of each respective interface control.

5. The method of claim 1, further comprising:
   maintaining in the table a status indicator for each portlet indicating whether a data update has been fetched for each respective portlet.

6. The method of claim 1, wherein the interface control of at least one of the plurality of portlets is a dial having settings based upon data obtained from the data source.

7. The method of claim 1, further comprising:
   providing an interaction engine to the client; and
   the interaction engine repetitively executing the fetching, updating, and switching steps for each respective portlet in accordance with each respective portlet refresh rate.

8. The method of claim 1, wherein each data source is a service provider of a Service Oriented Architecture, wherein each data update is provided as part of a Web service established between the service provider and a portal server that interfaces with the Service Oriented Architecture, wherein the interaction engine interfaces with the portal server.

9. The method of claim 1, wherein said steps of claim 1 are steps performed by at least one machine in accordance with at least one computer program having a plurality of code sections that are executable by the at least one machine.

10. A method for updating portlet information comprising:
    identifying a plurality of portlets presented on a client, where each portlet includes an interface control that is iteratively updated from at least one remote data source;
    for each portlet, establishing a presented version of the interface control and a hidden version of the interface control;
    maintaining, at the client, a table having the presented version, the hidden version, and refresh times for each portlet, wherein the refresh times indicate how often and when next the associated portlet is to be refreshed, and wherein the refresh times vary among the portlets;
    for each portlet, fetching data from the remote data source by the client in accordance with the refresh times for each portlet respectively;
    responsive to receiving fetched data, updating the hidden version of the interface control using fetched data for each portlet respectively by the client;
    responsive to the hidden version of each portlet being updated, switching the hidden version of each portlet respectively with the presented version in the table, wherein the switching causes the hidden version to become a new presented version to be displayed and the presented version to become a new hidden version to be updated; and
    repeating the fetching, updating, and switching for each portlet respectively in accordance with a portlet refresh rate based on the refresh times.

11. The method of claim 10, wherein particular ones of the portlets have different portlet specific refresh rates between one and ten seconds.

12. The method of claim 10, further comprising:
establishing an interaction engine on the client; wherein the interaction engine manages the fetching, updating, and switching steps for the client, which includes performing the steps for each of the portlets, and wherein the interaction engine is implemented as at least one of an applet, a JAVASCRIPT, and an AJAX script.

13. The method of claim 12, wherein the interaction engine interfaces with a portal server, wherein the portal server is remotely located from the client and the at least one remote data source, and wherein the portal server functions as a communication intermediary between the client and the at least one remote data source.

14. The method of claim 13, wherein the data source is a service provider of a Service Oriented Architecture, wherein the data update is provided as part of a Web service established between the service provider and the portal server.

15. The method of claim 10, wherein the steps of claim 10 are performed by at least one of a service agent and a computing device manipulated by the service agent, the steps being performed in response to a service request.

16. A system for updating portlet information comprising:
a non-transitory storage medium;
an interaction engine implemented as software stored on the non-transitory storage medium for controlling hardware to perform processes for which the interaction engine is configured, said interaction engine being configured to handle updates for a plurality of portlets of a client maintained in a table at the client, wherein each portlet in the table comprises:
    an interface control that is iteratively updated from a data source;
    a presented version of the interface control that is presented to a user of the client and that is referenced in the table; and
    a hidden version of the interface control configured to be directly updated from data received from the data source and that is referenced in the table;
wherein after an update occurs and before a new update is fetched from the data source, the hidden version is switched with the presented version in the table, and wherein the switching causes the hidden version to become a new presented version to be displayed by the client and the presented version to become a new hidden version to be updated;
wherein refresh times for each of the plurality of portlets are maintained in the table and each of the plurality of portlets are updated at the refresh times indicated in the table, wherein the refresh times indicate how often and when next the associated portlet is to be refreshed, and wherein the refresh times vary among the portlets, wherein the table further indicates a version for each portlet indicating a version of the interface control to be displayed in the portlet.

17. The system of claim 16, further comprising:
a portal server comprising hardware and software executable upon said hardware, said portal server being remotely located from the client and from the data source, wherein the portal server functions as a communication intermediary between the client and the data source.

18. The system of claim 17, further comprising:
a service provider comprising hardware and software executable upon said hardware, said portal server being a component of a Service Oriented Architecture configured as the data source, wherein portlet updates are provided as part of a Web service established between the service provider and the portal server.

* * * * *